US008875093B2

(12) United States Patent
Balasubramanian et al.

(10) Patent No.: US 8,875,093 B2
(45) Date of Patent: Oct. 28, 2014

(54) INSTANTIATING A CODING COMPETITION TO DEVELOP A PROGRAM MODULE IN A NETWORKED COMPUTING ENVIRONMENT

(75) Inventors: Swaminathan Balasubramanian, Troy, MI (US); Rick A. Hamilton, II, Charlottesville, VA (US); Brian M. O'Connell, RTP, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/495,267

(22) Filed: Jun. 13, 2012

(65) Prior Publication Data

US 2013/0339920 A1 Dec. 19, 2013

(51) Int. Cl.
*G06F 9/44* (2006.01)
*G06Q 10/06* (2012.01)

(52) U.S. Cl.
CPC . *G06F 8/20* (2013.01); *G06Q 10/06* (2013.01)
USPC ........................................................ 717/102

(58) Field of Classification Search
CPC ........................................................ G06F 9/44
USPC .............. 463/9; 705/7, 11; 717/102, 101, 100
See application file for complete search history.

(56) References Cited

U.S. PATENT DOCUMENTS

| 6,569,012 | B2 * | 5/2003 | Lydon et al. ...................... 463/9 |
| 6,658,642 | B1 * | 12/2003 | Megiddo et al. ............... 717/101 |
| 6,874,140 | B1 | 3/2005 | Shupak |
| 7,584,458 | B2 | 9/2009 | Das et al. |
| 7,703,075 | B2 | 4/2010 | Das et al. |
| 7,987,456 | B2 | 7/2011 | Mariani |
| 8,141,036 | B2 | 3/2012 | Wagner et al. |
| 8,667,456 | B1 * | 3/2014 | Czymontek ................... 717/100 |
| 2001/0027411 | A1 | 10/2001 | Ikeda |

(Continued)

FOREIGN PATENT DOCUMENTS

| JP | 2005216233 A | 8/2005 |
| JP | 2009193335 A | 8/2009 |
| WO | 02/056144 A2 | 7/2002 |

OTHER PUBLICATIONS

Cheng, Li-Te et al., "Building Collaboration into IDEs", Dec. 2003, ACM, pp. 42-50.*

(Continued)

*Primary Examiner* — Lewis A Bullock, Jr.
*Assistant Examiner* — Gilles Kepnang
(74) *Attorney, Agent, or Firm* — William E. Schiesser; Keohane & D'Alessandro, PLLC

(57) ABSTRACT

Embodiments of the present invention relate to the instantiation of a coding competition to address problems in program modules. In a typical embodiment, a first annotation will be detected in a program code file having a set of program modules. The first annotation generally indicates a need for a functionality associated with at least one program module of the set of program modules. Responsive to a lack of an existing library comprising the solution, an indication to instantiate a coding competition among a set of developers will be received to provide the solution. In response to the indication, a second annotation will be inserted into the program code file. The coding competition may then be instantiated to identify a set of developer libraries having a potential to provide the solution. Based on the coding competition, the solution may then be identified and implemented.

22 Claims, 6 Drawing Sheets

(56) References Cited

U.S. PATENT DOCUMENTS

| | | | |
|---|---|---|---|
| 2005/0160395 A1* | 7/2005 | Hughes | 717/102 |
| 2008/0163157 A1* | 7/2008 | Atkin et al. | 717/101 |
| 2009/0138898 A1* | 5/2009 | Grechanik et al. | 719/328 |
| 2009/0192849 A1* | 7/2009 | Hughes et al. | 705/7 |
| 2010/0030626 A1* | 2/2010 | Hughes et al. | 705/11 |
| 2011/0307304 A1 | 12/2011 | Mercuri | |

OTHER PUBLICATIONS

Hidalgo, Jorge, "Code Generation using Annotation Processors in the Java language—part 1: Annotation Types", Sep. 26, 2011.*

Hidalgo, Jorge, "Code Generation using Annotation Processors in the Java language—part 2: Annotation Processors", Oct. 8, 2011.*

Hidalgo, Jorge, "Code Generation using Annotation Processors in the Java language—part 3: Generating Source Code", Oct. 31, 2011.*

Thummalapenta, Suresh et al. "Parseweb: a programmer assistant for reusing open source code on the web." Proceedings of the twenty-second IEEE/ACM international conference on Automated software engineering. ACM, 2007.*

"IBM's marketplace for bringing value to our clients in shortcycle assignments", Liquid at a Glance, published Oct. 6, 2011, 4 pages.

Maitland, J., "Keeping Control Isn't Easy", Chapter 4: Cloud-Based Infrastructure, SearchCloudComputing.com, 13 pages.

Mell, P. et al., "The NIST Definition of Cloud Computing", National Institute of Standards and Technology, Information Technology Laboratory, Version 15, Oct. 7, 2009, 2 pages.

PCT, Notification of Transmittal of the International Search Report and the Written Opinion of the International Searching Authority, or the Declaration, International Application No. PCT/IB2013/053980, Date of Mailing Sep. 10, 2013, 11 pages.

* cited by examiner

US 8,875,093 B2

INSTANTIATING A CODING COMPETITION TO DEVELOP A PROGRAM MODULE IN A NETWORKED COMPUTING ENVIRONMENT

TECHNICAL FIELD

Embodiments of the present invention relate to program module development. Specifically, embodiments of the present invention relate to an approach to instantiate a coding competition to develop a program in a networked computing environment (e.g., a cloud computing environment).

BACKGROUND OF THE INVENTION

A code repository is typically a searchable, categorized, and/or Internet accessible location that users may access to browse, search, and download source or compiled library code. Uses of code repositories may include open source projects, proprietary development projects, and/or projects that create libraries for later use. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time.

Challenges may exist however, when problems (e.g., runtime errors, etc.) are determined to exist in one or more program modules contained in a program code file or the like. Specifically, existing approaches typically rely upon existing solutions and/or libraries to solve problems that arise. Such an approach may fail to customize solutions to the particulars of each problem. As such, the problems may not be fully and/or correctly resolved.

SUMMARY

In general, embodiments of the present invention relate to the instantiation of a coding competition to address a need for functionality in program modules (e.g., contained in program files). In a typical embodiment, a first annotation will be detected in a program code file having a set of program modules. The first annotation generally indicates a need for a particular functionality (e.g., solution to a problem) associated with at least one program module of the set of program modules. Responsive to a lack of an existing library providing the functionality, an indication to instantiate a coding competition among a set of developers will be received. In response to the indication, a second annotation (e.g., comprising a set of attributes of the coding competition) will be inserted into the program code file. The coding competition may then be instantiated based on the set of attributes to identify a set of developer libraries having a potential to provide the functionality. A developer library may then be identified from the set of developer libraries that best meets the set of attributes. The functionality may be obtained from the developer library and implemented.

A first aspect of the present invention provides a computer-implemented method for instantiating a coding competition to develop a program module in a networked computing environment, comprising: detecting a first annotation in a program code file having a set of program modules, the first annotation indicating a need for a functionality associated with at least one program module of the set of program modules; receiving, responsive to a lack of an existing library comprising the functionality, an indication to instantiate the coding competition among a set of developers to provide the functionality; inserting a second annotation into the program code file, the second annotation comprising a set of attributes of the coding competition; instantiating the coding competition based on the set of attributes to identify a set of developer libraries having a potential to provide the functionality; and identifying a developer library from the set of developer libraries that best meets the set of attributes.

A second aspect of the present invention provides a system for instantiating a coding competition to develop a program module in a networked computing environment, comprising: a memory medium comprising instructions; a bus coupled to the memory medium; and a processor coupled to the bus that when executing the instructions causes the system to: detect a first annotation in a program code file having a set of program modules, the first annotation indicating a need for a functionality associated with at least one program module of the set of program modules; receive, responsive to a lack of an existing library comprising the functionality, an indication to instantiate the coding competition among a set of developers to provide the functionality; insert a second annotation into the program code file, the second annotation comprising a set of attributes of the coding competition; instantiate the coding competition based on the set of attributes to identify a set of developer libraries having a potential to provide the functionality; and identify a developer library from the set of developer libraries that best meets the set of attributes.

A third aspect of the present invention provides a computer program product for instantiating a coding competition to develop a program module in a networked computing environment, the computer program product comprising a computer readable storage media, and program instructions stored on the computer readable storage media, to: detect a first annotation in a program code file having a set of program modules, the first annotation indicating a need for a functionality associated with at least one program module of the set of program modules; receive, responsive to a lack of an existing library comprising the functionality, an indication to instantiate the coding competition among a set of developers to provide the functionality; insert a second annotation into the program code file, the second annotation comprising a set of attributes of the coding competition; instantiate the coding competition based on the set of attributes to identify a set of developer libraries having a potential to provide the functionality; and identify a developer library from the set of developer libraries that best meets the set of attributes.

A fourth aspect of the present invention provides a method for deploying a system for instantiating a coding competition to develop a program module in a networked computing environment, comprising: providing a computer infrastructure being operable to: detect a first annotation in a program code file having a set of program modules, the first annotation indicating a need for a functionality associated with at least one program module of the set of program modules; receive, responsive to a lack of an existing library comprising the functionality, an indication to instantiate the coding competition among a set of developers to provide the functionality; insert a second annotation into the program code file, the second annotation comprising a set of attributes of the coding competition; instantiate the coding competition based on the set of attributes to identify a set of developer libraries having a potential to provide the functionality; and identify a developer library from the set of developer libraries that best meets the set of attributes.

BRIEF DESCRIPTION OF THE DRAWINGS

These and other features of this invention will be more readily understood from the following detailed description of the various aspects of the invention taken in conjunction with the accompanying drawings in which.

Figure 1:
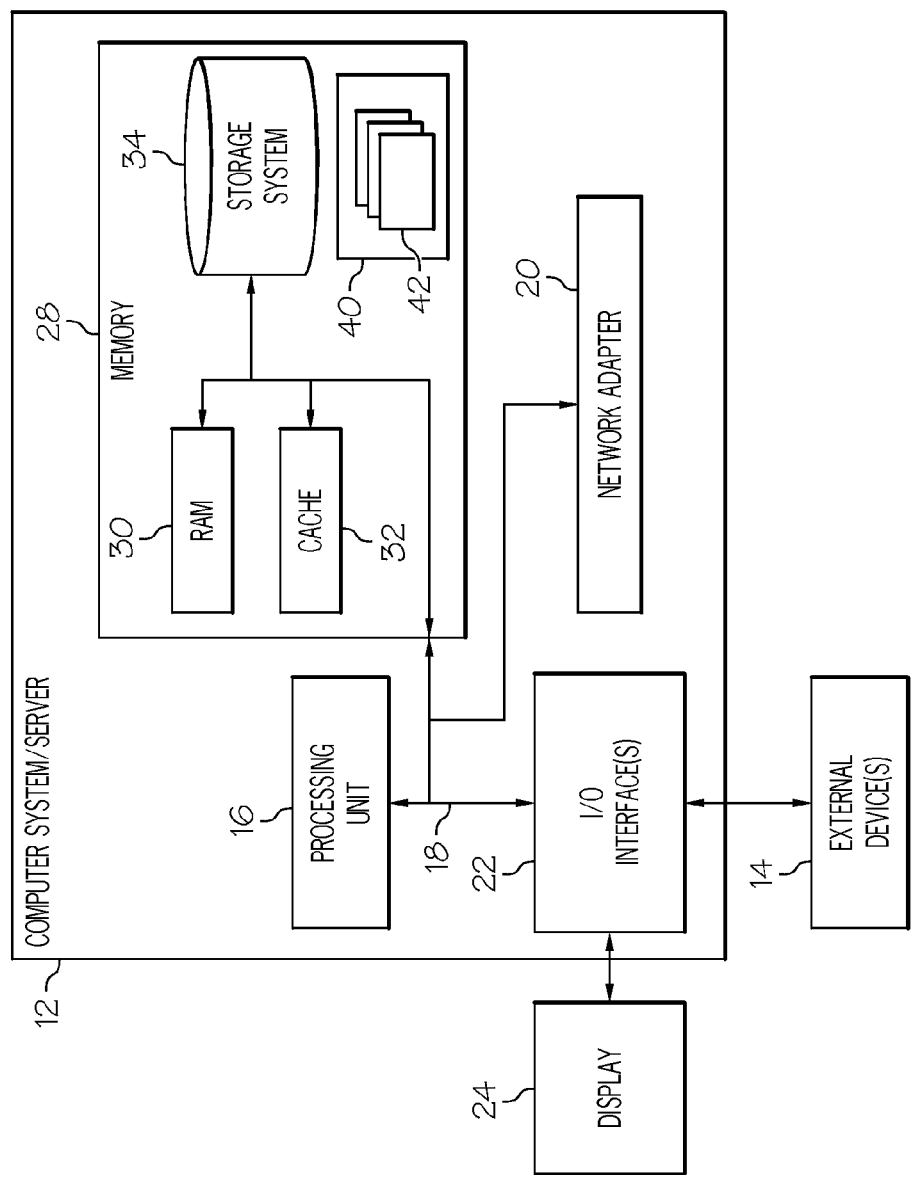
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention relate to the instantiation of a coding competition to address a need for functionality in program modules (e.g., contained in program files). In a typical embodiment, a first annotation will be detected in a program code file having a set of program modules. The first annotation generally indicates a need for a particular functionality (e.g., solution to a problem) associated with at least one program module of the set of program modules. Responsive to a lack of an existing library providing the functionality, an indication to instantiate a coding competition among a set of developers will be received. In response to the indication, a second annotation (e.g., comprising a set of attributes of the coding competition) will be inserted into the program code file. The coding competition may then be instantiated based on the set of attributes to identify a set of developer libraries having a potential to provide the functionality. A developer library may then be identified from the set of developer libraries that best meets the set of attributes. The functionality may be obtained from the developer library and implemented.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Coding competition instantiation program/utility 40, having a set (at least one) of program modules 42, may be stored in memory 28 by way of example, and not limitation, as well as an operating system, one or more application programs, other program modules, and program data. In general, Coding competition instantiation 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
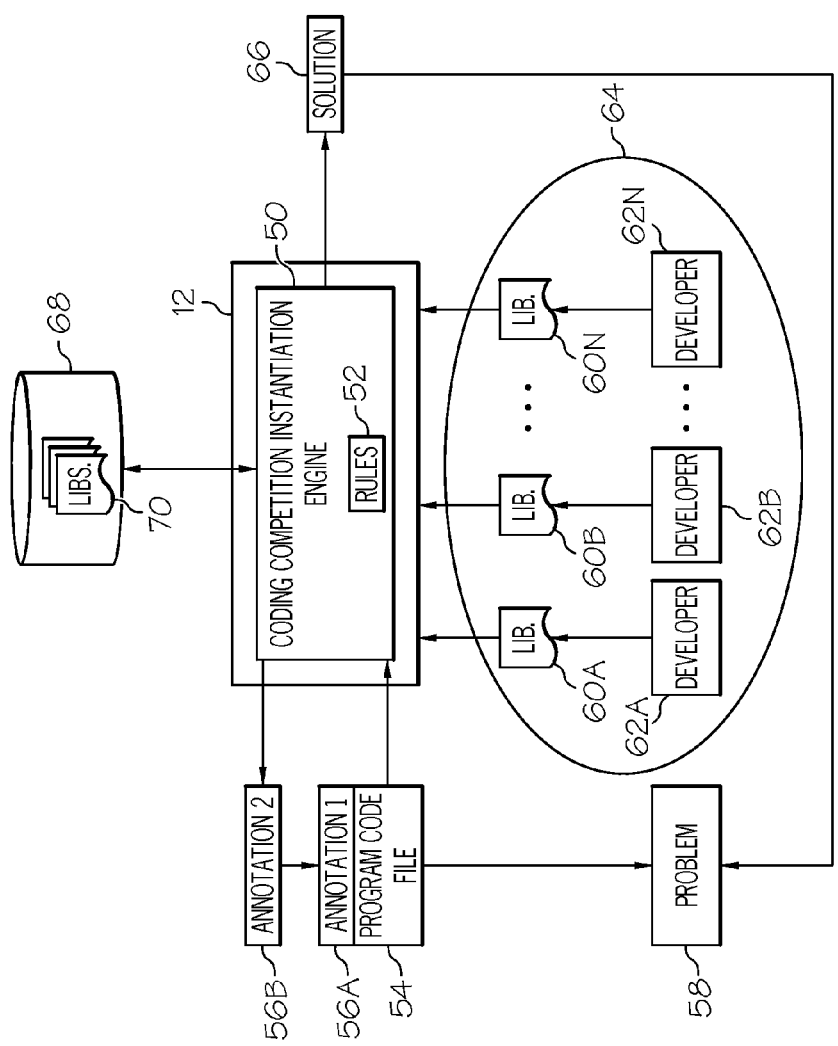
FIG. 2 depicts a system diagram according to an embodiment of the present invention.

Referring now to FIG. 2, a system diagram describing the teachings discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment (e.g., a cloud computing environment), each client need not have a coding competition instantiation engine (engine 50). Rather, engine 50 could be loaded on a server (e.g., payment processing server) or server-capable device that communicates (e.g., wirelessly) with the clients to provide coding competition instantiation functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides coding competition instantiation functionality hereunder. In general, engine may be implemented as part of or in conjunction with an integrated development environment (IDE).

Along these lines, engine 50 may perform multiple functions similar to a general-purpose computer. Specifically, among other functions, engine 50 may (among other things): detect a first annotation 56A in a program code file 54, the first annotation 56A indicating a need for a solution 66 to a problem 58 associated with the program code file 54; search, in at least one computer storage device 68, for an existing library 70 that comprises the solution 66; receive, responsive to a lack of an existing library 70 comprising the solution 66, a request to implement a coding competition 64 among a set of developers to provide the solution 66; insert a second annotation 56B into the program code file 54, the second annotation 56B comprising a set of attributes of the coding competition 64 (e.g., a title, a description, a start date, an end date, a contact, a reward, etc.); implement the coding competition 64 based on the set of attributes to identify a set of developer libraries 60A-N (e.g., from competing developers 62A-N) having a potential to provide the solution 66; identify a developer library from the set of developer libraries 60A-N that best meets the set of attributes; identify the solution 66 from the developer library; implement the solution 66 to address the problem 58; and/or provide the reward to at least one developer associated with the developer library. It is understood that although FIG. 2 depicts a solution and a problem, the teachings recited herein can be implemented to obtain any type of functionality (e.g., not just "solutions" to "problems").

Figure 3:
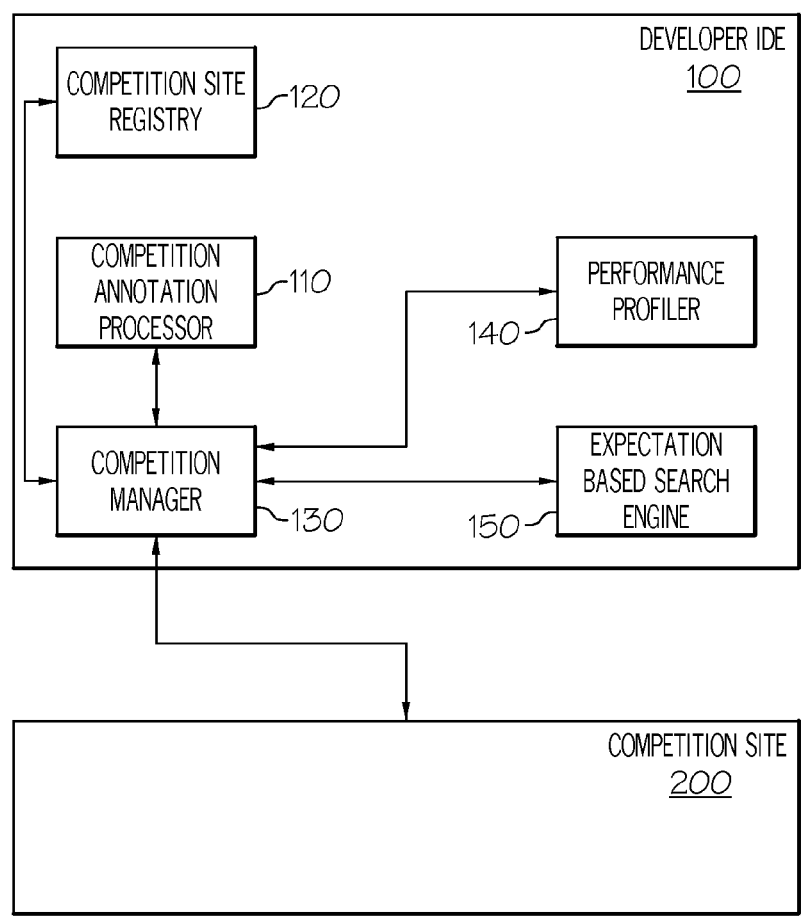
FIG. 3 depicts a more detailed diagram of the system of FIG. 2 according to an embodiment of the present invention.

Referring now to FIG. 3, a more detailed diagram of program 40 (FIG. 1) and/or engine 50 (FIG. 2) is shown. Specifically, FIG. 3 depicts program 40/engine 50 implemented via a developer IDE 100 and competition network site 200. Within IDE 100, competition annotation processor 110 is configured/adapted to extract competition-related annotations from program code files. Competition manager 130 utilizes competition site registry 120 to obtain a list of sites in which requests may be opened. Competition manager 130 may also utilize expectation-based search engine 150 to detect competition opportunities as well as to detect withdrawal opportunities. In addition, competition manager 130 may utilize performance profiler 140 in determining if a developed library meets developer specifications for performance. Finally, competition manager 130 may open competitions within competition site 200. Developers may interact with competition site 200 to provide libraries with solutions to code problems.

ILLUSTRATIVE EXAMPLE

This section will describe various functions performed by engine 50 according to an illustrative example hereunder.

Annotation Parsing: Assume in an example that a user is seeking a library to perform base 64 (FIG. 2) encoding of strings. For their application, further assume that the user wishes the return from the library call to also be a string. To initiate a search, the user may enter the following into the code where they wish to make the library invocation:

@Description (base64, decode)
@Expect("hello"). Returns("aGVsbG8=")
@Signature("public String <method> String")

The above set of instructions request the IDE to invoke a search of repositories for methods containing the terms "base64" and "decode". For matching methods, the IDE may then narrow down methods that are public, return a string object and expect a single string object as a parameter. Furthermore, if that method is passed a string of "hello", the return value from that method should be a string of "aGVsbG8=". The user may then be presented a list of matching methods, and the libraries from which those methods belong. If the IDE is unable to find a matching library for the supplied annotations, the developer may wish to have the library newly developed and delivered via a competition. A new annotation may be utilized to facilitate this process as described below in the following example:

@Description (base64, decode)
@Competition (title="Method to perform base64 encoding of strings", description=<descrip>, start-date="mm/dd/yy", end-date="mm/dd/yy", contact="jdoe@company.com", fixed-cost="$1234")
@Expect("hello").Returns("aGVsbG8=") @Signature ("public String <method> String")

Coding Competition: In one embodiment, this annotation may be added by the developer while declaring all the annotations related to the method. In an alternate embodiment, the IDE, upon finding no matches from the library search, may prompt the developer with an option to convert the search into a competition. The developer adds the @Competition annotation along with, but not limited to, the following attributes: title of the competition, description for the competition, and/or start and end dates cost that may be fixed or time/material contact. In addition, the IDE appends the other annotations that the developer provided that were used for the search.

Competition Opportunity Detection: If the IDE is unable to find a matching library for the supplied annotations, then the IDE attempts to convert the search to a competition request. In one embodiment, the IDE scans the entire code-base for additional methods where matches are not found and combines them into a single competition.

Competition Creation: The developer may configure multiple competition sites to which the IDE posts the request. Alternately, the developer may maintain a sequence in which the request must be created in multiple competition sites. For instance, the developer may want the request to be first opened within the corporate site. If the request remains open for a pre-defined amount of time with no update, then the competition must be opened within a public, but open, source site. Finally, the request may be opened within a commercial site where all competitions are paid. In addition, the developer may also specify what the IDE should do with the competition in the previous site in the sequence when one is created in the next site (allow the competition to remain open, or close the competition).

Automatic Competition Result Acceptance and Incorporation: The IDE periodically checks competition sites for open competition status. If a competition indicates its status is complete, the IDE may perform multiple steps. Specifically, the IDE may:

(1) Download and test the library created in the competition against the expectations specified by the developer. In this step, the IDE may request the developer to supply additional test data.

(2) If the library passes the acceptance test, the IDE may automatically incorporate the library into the project and close the competition.

Competition Withdrawal Opportunity Detection: The IDE periodically repeats searches for which competitions are currently open. If the IDE finds a library match when one was not found previously, the IDE notifies the developer of an opportunity to withdraw the open competition.

Competition Removal/Improvement: The developer may define the component and subsequent competition during the architecture phase of the project. This enables the developer to request competition for some work pieces, while focusing the developer on other areas. The developer may then later return to the annotated section and develop the code themselves if they have finished other parts of the project and the code has yet to be developed. Depending on the developer's action, the coding competition may be removed or modified. If the developer removes the competition tag, the system removes the competition from the competition site. In another scenario, the developer may update the competition tags with a performance increase annotation that specifies the percent faster than the current implementation. For example, the developer may still keep the competition open if someone can write this section of the module that runs 20% faster than the developer's own implementation. Execution times and improvement may be measured with automatically generated micro-benchmarks.

Figure 4A:
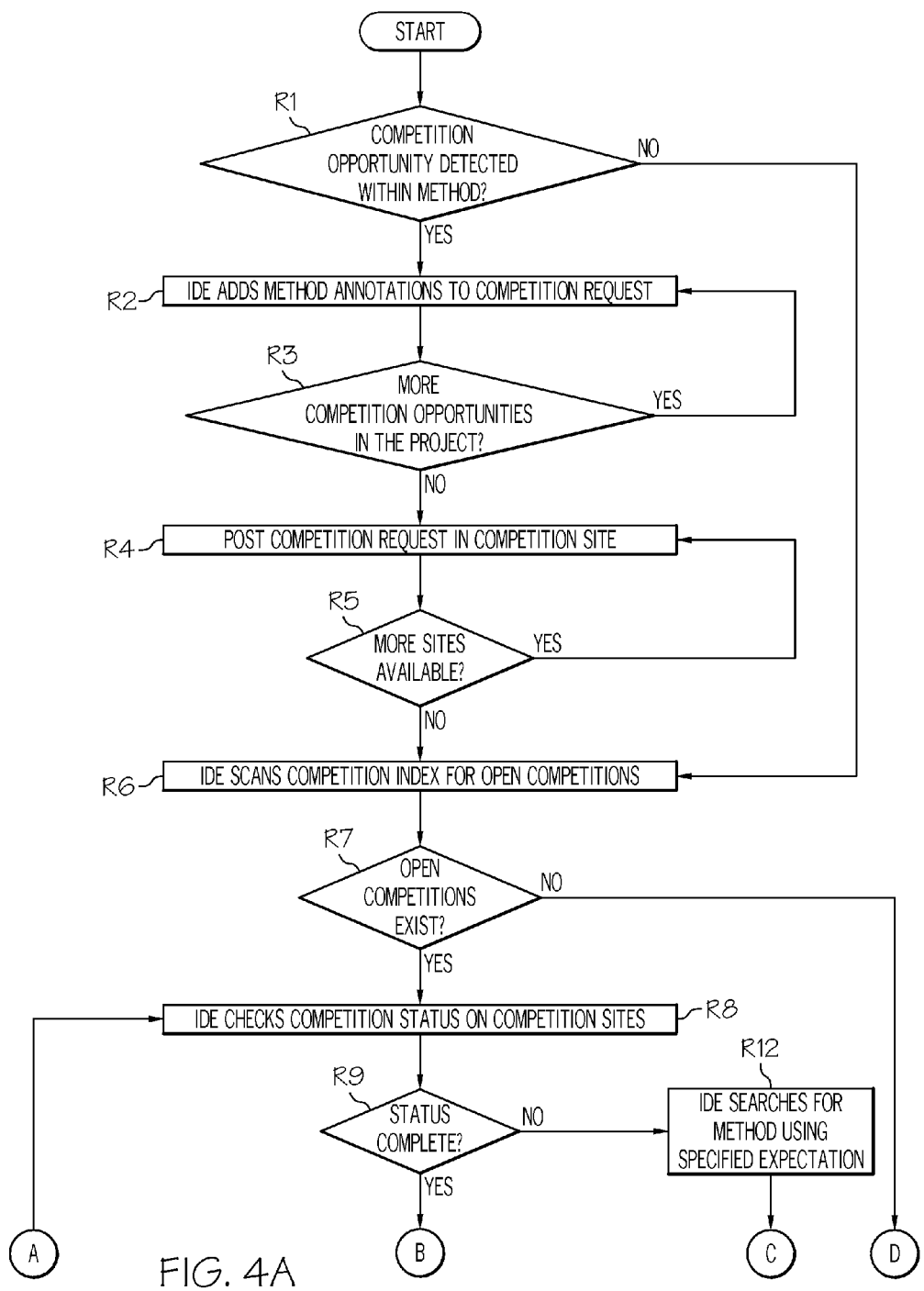
FIG. 4 depicts another method flow diagram according to an embodiment of the present invention.
Figure 4B:
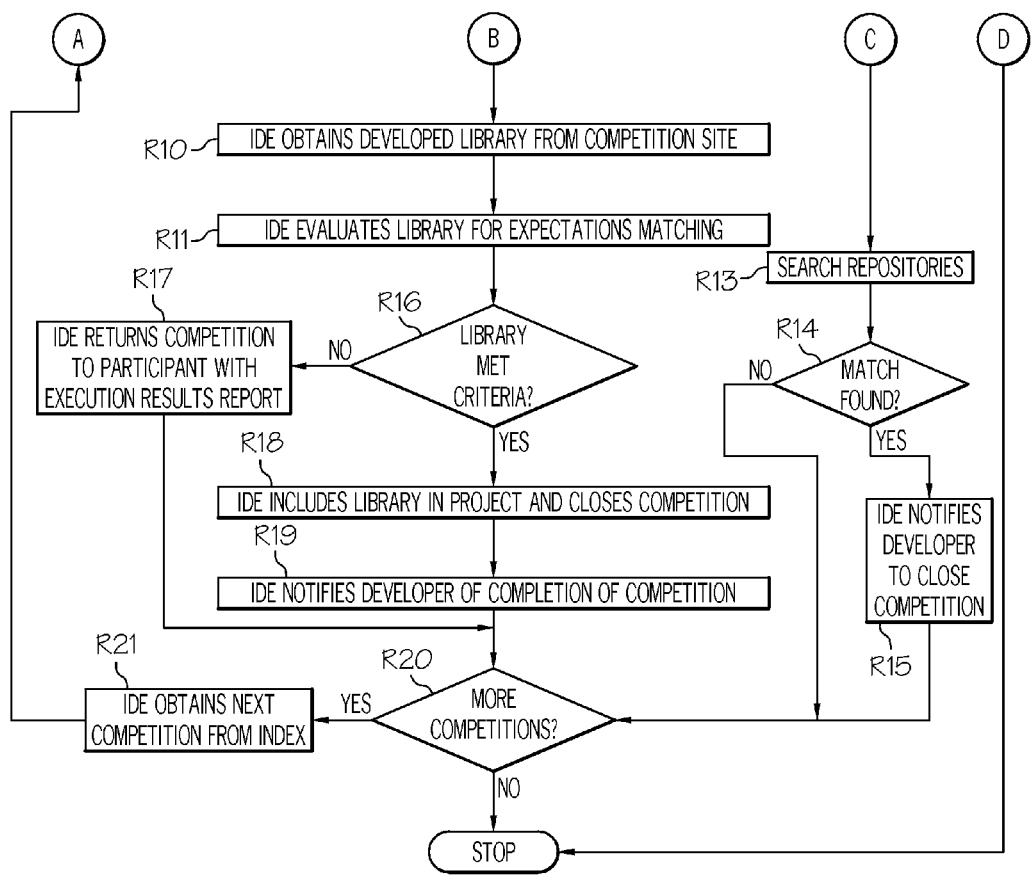

Referring now to FIGS. 4A and 4B, a method flow diagram according to an embodiment of the present invention is shown. In step R1, it is determined whether a competition opportunity is detected. If not, the process flows to step R6. If so, the IDE adds the associated annotations to a competition request in step R2. In step R3, it is determined whether more competition opportunities are present in the project. If so, the process returns to step R2. If not, the competition request is posted in the competition site in step R4. In step R5, it is determined whether additional competition sites are available. If so, the process returns to step R4. If not, the IDE scans the competition index for open competitions in step R6, and in step R7, it is determined whether open competitions exist. If not, the process may end. If so, the IDE checks the competition statuses on the competition sites in step R8. In step R9, it is determined whether the status is complete. If so, the IDE obtains the developed library from the competition site in step R10 and evaluates the library for matches in step R11. In step R16, it is determined whether the library criteria have been met. If not, the IDE returns the competition to the participant/user with a results report in step R17. If so, the IDE includes the library in the project and closes the competition in step R18. In step R19 the IDE notifies the developer of the completion of the competition.

If, in step R9, the competition had a status of incomplete, the IDE would search of a method using a specified exception in step 12, and then search available repositories in step S13. In step S14, it is determined if a match is found. If not, the process flows to step R20. If so, the IDE notifies the developer to close the competition R15. In step R20, it is determined whether additional competitions are in progress. If so, the IDE obtains the next competition from the index in step R21 and the process returns to step R8. If not, the process may end.

Figure 5:
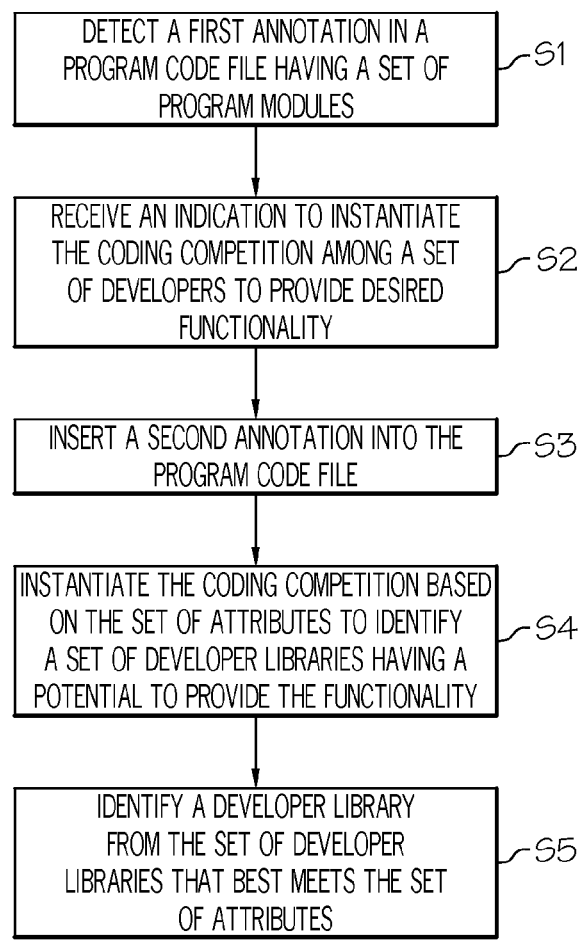
FIG. 5 depicts another method flow diagram according to an embodiment of the present invention.

Referring now to FIG. 5, another method flow diagram according to an embodiment of the present invention is shown (e.g., as enabled by engine 50 of FIG. 2). As depicted, in step S1, a first annotation is detected in a program code file, the first annotation indicating a need for a functionality associated with the program code file. In step S2, a request to implement a coding competition among a set of developers to provide the functionality is received in response to a lack of an existing library 70 comprising the functionality. In step S3, a second annotation is inserted into the program code file, the second annotation comprising a set of attributes of the coding competition. In step S4, the coding competition is instantiated based on the set of attributes to identify a set of developer libraries having a potential to provide the functionality. In step S5, a developer library is identified from the set of developer libraries that best meets the set of attributes.

While shown and described herein as a coding competition instantiation solution, it is understood that the invention further provides various alternative embodiments. For example, in one embodiment, the invention provides a computer-readable/useable medium that includes computer program code to enable a computer infrastructure to provide coding competition instantiation as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide coding competition instantiation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for coding competition instantiation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for instantiating a coding competition to develop a program module in a networked computing environment, comprising:
    inserting, by a user, a first annotation at a library invocation point in a program code file having a set of program modules, wherein the first annotation comprises actionable syntactic metadata to search for a needed functionality associated with at least one program module of the set of program modules;
    invoking the first annotation to thereby initiate a search of one or more repositories;
    performing the search of the one or more repositories, in order to determine and find an existing library comprising the functionality;
    receiving, responsive to a lack of the existing library comprising the functionality, an indication that the library does not exist and to instantiate a coding competition among a set of developers to provide the functionality;
    inserting a second annotation into the program code file, the second annotation comprising a set of attributes of the coding competition;
    instantiating the coding competition based on the set of attributes, checking whether the coding competition is complete, and upon completion, obtaining a set of developer libraries having a potential to provide the functionality; and
    identifying a developer library from the set of developer libraries that best meets the set of attributes.

2. The computer-implemented method of claim 1, further comprising identifying the functionality from the developer library.

3. The computer-implemented method of claim 2, further comprising implementing the functionality to address the need for the functionality.

4. The computer-implemented method of claim 1, the set of attributes comprising at least one of the following: a title, a description, a start date, an end date, a contact, and a reward associated with the coding competition.

5. The computer-implemented method of claim 4, further comprising providing the reward to at least one developer associated with the developer library.

6. The computer-implemented method of claim 1, the computer-implemented method being implemented via an integrated development environment (IDE).

7. The computer-implemented method of claim 1, further comprising searching, in at least one computer storage device, for an existing library that comprises the functionality.

8. A system for instantiating a coding competition to develop a program module in a networked computing environment, comprising: a memory medium comprising instructions; a bus coupled to the memory medium; and a processor coupled to the bus that when executing the instructions causes the system to:
   insert, by a user, a first annotation at a library invocation point in a program code file having a set of program modules, wherein the first annotation comprises actionable syntactic metadata to search for a needed functionality associated with at least one program module of the set of program modules;
   invoke the first annotation to thereby initiate a search of one or more repositories;
   perform the search of the one or more repositories, in order to find an existing library comprising the functionality
   receive, responsive to a lack of the existing library comprising the functionality, a request to instantiate the coding competition among a set of developers to provide the functionality;
   insert a second annotation into the program code file, the second annotation comprising a set of attributes of the coding competition;
   instantiate the coding competition based on the set of attributes, check whether the coding competition is complete, and upon completion, obtain a set of developer libraries having a potential to provide the functionality; and
   identify a developer library from the set of developer libraries that best meets the set of attributes.

9. The system of claim 8, the memory medium further comprising instructions for causing the system to identify the functionality from the developer library.

10. The system of claim 9, the memory medium further comprising instructions for causing the system to implement the functionality to address the need for the functionality.

11. The system of claim 8, the set of attributes comprising at least one of the following: a title, a description, a start date, an end date, a contact, and a reward associated with the coding competition.

12. The system of claim 11, the memory medium further comprising instructions for causing the system to provide the reward to at least one developer associated with the developer library.

13. The system of claim 8, the system being implemented via an integrated development environment ODE).

14. The system of claim 8 the memory medium further comprising instructions for causing the system to search, in at least one computer storage device, for an existing library that comprises the functionality.

15. A computer program product for instantiating a coding competition to develop a program module in a networked computing environment, the computer program product comprising a computer readable storage device, and program instructions stored on the computer readable storage device, to:
   insert, by a user, a first annotation at a library invocation point in a program code file having a set of program modules, wherein the first annotation comprises actionable syntactic metadata to search for a needed functionality associated with at least one program module of the set of program modules;
   invoke the first annotation to thereby initiate a search of one or more repositories;
   perform the search of the one or more repositories, in order to find an existing library comprising the functionality
   receive, responsive to a lack of the existing library comprising the functionality, a request to instantiate the coding competition among a set of developers to provide the functionality;
   insert a second annotation into the program code file, the second annotation comprising a set of attributes of the coding competition;
   instantiate the coding competition based on the set of attributes, check whether the coding competition is complete, and upon completion, obtain a set of developer libraries having a potential to provide the functionality; and
   identify a developer library from the set of developer libraries that best meets the set of attributes.

16. The computer program product of claim 15, the computer readable storage device further comprising instructions to identify the functionality from the developer library.

17. The computer program product of claim 16, the computer readable storage device further comprising instructions to implement the functionality to address the need for the functionality.

18. The computer program product of claim 15, the set of attributes comprising at least one of the following: a title, a description, a start date, an end date, a contact, and a reward associated with the coding competition.

19. The computer program product of claim 18, the computer readable storage device further comprising instructions to provide the reward to at least one developer associated with the developer library.

20. The computer program product of claim 15, the computer program product being implemented via an integrated development environment (IDE).

21. The computer program product of claim 15, the computer readable storage device further comprising instructions to search, in at least one computer storage device, for an existing library that comprises the functionality.

22. A method for deploying a computer system for instantiating a coding competition to develop a program module in a networked computing environment, the method comprising:
   the computer system inserting, by a user, a first annotation at a library invocation point in a program code file having a set of program modules, wherein the first annotation comprises actionable syntactic metadata to search for a needed functionality associated with at least one program module of the set of program modules;
   the computer system invoking the first annotation to thereby initiate a search of one or more repositories;
   the computer system performing the search of the one or more repositories, in order to find an existing library comprising the functionality
   the computer system receiving, responsive to a lack of the existing library comprising the functionality, a request to instantiate the coding competition among a set of developers to provide the functionality;

the computer system inserting a second annotation into the program code file, the second annotation comprising a set of attributes of the coding competition;

the computer system instantiating the coding competition based on the set of attributes, checking whether the coding competition is complete, and upon completion, obtaining a set of developer libraries having a potential to provide the functionality; and the computer system identifying a developer library from the set of developer libraries that best meets the set of attributes.

* * * * *